United States Patent [19]

Messerly

[11] 4,389,361

[45] Jun. 21, 1983

[54] PROCESS FOR MOLDING FIBER LOADED RUBBER COMPOUND

[75] Inventor: James W. Messerly, Stow, Ohio

[73] Assignee: The B. F. Goodrich Company, New York, N.Y.

[21] Appl. No.: 282,764

[22] Filed: Jul. 13, 1981

Related U.S. Application Data

[63] Continuation-in-part of Ser. No. 206,519, Nov. 13, 1980, abandoned.

[51] Int. Cl.$^3$ ............................................. D04H 3/16
[52] U.S. Cl. ................................. 264/108; 264/115; 264/236; 264/347
[58] Field of Search ............... 264/115, 108, 236, 347

[56] References Cited

U.S. PATENT DOCUMENTS

| | | | |
|---|---|---|---|
| 2,554,607 | 5/1951 | Woolf | 264/115 |
| 3,249,658 | 5/1966 | Hodges | 264/25 |
| 3,761,558 | 9/1973 | Hnatek | 264/347 |
| 4,100,241 | 7/1978 | Hampshire | 264/115 |
| 4,229,397 | 10/1980 | Fukuta et al. | 264/115 |

*Primary Examiner*—James R. Hall
*Attorney, Agent, or Firm*—Joseph Januszkiewicz

[57] ABSTRACT

A process for making an elastomeric compound that has chopped fibers dispersed throughout the compound with orientation of the chopped fibers to increase the modulus and strength of the compound by milling the fiber loaded compound to break up the fibers and thereafter mold and then vulcanize the resulting product.

11 Claims, No Drawings

PROCESS FOR MOLDING FIBER LOADED RUBBER COMPOUND

This is a continuation-in-part application of application Ser. No. 206,519, filed on Nov. 13, 1980, now abandoned.

BACKGROUND OF THE INVENTION

This invention relates to the manufacture of fiber reinforced materials and more particularly to a new and improved process for making elastomeric compounds reinforced with chopped fibers. To improve the physical properties of fiber reinforced elastomers, such as stiffness and modulus, it has become desirable to incorporate filamentary reinforcing materials to the elastomer prior to the molding or shaping into the desired form. One method of fabricating hose and belts utilizes an extruder and has the fiber material injected into the hose by blowing the fibers against the hose. Another method is to extrude a product with an elastomeric compound containing fibers mixed into the compound at the extruder. Other methods include the chopping of fibers to the desired length and then admixing the fibers to the compound and then molding the compound to the desired stage. One problem encountered in the manufacture of fiber loaded compounds is that standard techniques pose problems in the mixing stage as where there is incorporation into the elastomeric compound of fibers greater than 20 parts per 100 parts of elastomer. The problems include difficulty in bagging, handling of the dry mixes, compound splitting and crumbling. Staple fibers are produced in various lengths, depending on their end use, ranging from ¼ of an inch for specialty papers, up to 5, 6 or 7 inches for blending with wool or other carpet fibers. The most common staple fiber lengths are 1½–1-9/16 inches intended to match appropriate grades of cotton fibers for use in the cotton spinning system.

The present invention is concerned with the improvement of fiber loaded elastomers or rubbers by introducing within the elastomeric or rubber materials itself filaments of long length such as approximately 1.6 inches in length with a diameter of 11 microns which it has been found in the processing technique used to increase processability and ending up with a product that has the fibers of small length (an average fiber length of approximately 0.125 inches). In the improved process, by starting out with extremely long fibers, it is easier to handle the materials, obtain a better distribution of the fibers and a subsequent breakdown of the fiber lengths to achieve a product with enhanced strength characteristics of the composite. Such increased strength characteristics include the entanglement of the fibers and their orientation which results from such processes. The term rubber as used herein includes rubber and the various synthetic materials having, or which may be compounded to impart, the characteristic flexibility and extensibility of rubber. The term rubber includes neoprene or nitrile rubber compounds. The fiber loaded composites containing the chopped fibers are particularly useful in enhancing the properties of the compound for use in tires, hose, belts and similar products.

The term elastomer is defined as a substance that can be stretched at room temperature to at least twice its original length and, after having been stretched and the stress removed, returns with force to approximately its original length in a short time. (See Glossary of Terms as prepared by ASTM Committee D-11 on Rubber and Rubber-like Materials. Published by the American Society for Testing Materials).

The elastomeric or rubber materials that can be used include natural rubber, copolymers of butadiene and acrylonitrile, copolymers of butadiene and styrene, copolymers of butadiene and alkyl acrylates, butyl rubber, olefin rubbers such as ethylene-propylene and EPDM rubber, flurocarbon rubbers, flurosilicone rubbers, silicone rubbers, chlorosulfonated polyethylene, polyacrylates, polybutadiene, polychloroprene and the like.

Preferred elastomeric materials include natural rubber, copolymers of butadiene/acrylonitrile and copolymers of butadiene and styrene which is often referred to as SBR.

Staple fibers are produced in various lengths, depending on their end use, ranging from ¼ inch for specialty papers up to 5, 6 or 7 inches for blending with wool or other carpet fibers. The most common staple fiber lengths are 1½ inch to 1-9/16 inch.

SUMMARY OF THE INVENTION

The present invention contemplates the chopping of filaments such as staple fibers into discrete particles or fibers of lengths greater than 1.25 inches and mixing such particles or fibers with elastomer for dispersion, entanglement and shearing of such fibers during the subsequent mixing and milling to a length of less than one inch and in some cases as an example averaging approximately 0.125 inches. Such fibers are oriented in a lengthwise direction by such mixing and milling, or extruding, followed by a curing of the fiber loaded elastomers to the desired shape.

DETAILED DESCRIPTION OF THE INVENTION

Fibers such as staple fibers of rayon in the form of continuous filaments are commercially available for use to make strands of definite length. The present invention utilizes the fibers of rayon by either using fibers of short length such as those between a range of 1 to 2 inches or by chopping the fibers into discrete particles or fibers having a length that averages approximately 1.6 inches. In chopping the filaments into discrete fibers, the length is not required to be consistent. The fibers can vary in length from one and one-fourth of an inch to two inches in length or greater.

A rubber compound is initially masticated or plasticized, after which the chopped discrete fibers are mixed as by a Brabender, or banbury, on a mill and into the rubber compound. During the mixing process where the chopped fibers are milled with the rubber compound, the fibers are broken into a length whose range is between 0.3 inches to 0.0625 inches. An example of a specific use is in neoprene v-belts where the staple rayon fibers (averaging 1.6 inches and 11 microns in diameter) mixes into a neoprene compound very well at loadings as high as 50 parts of fiber to 100 parts of neoprene compound and gives improved stiffness properties not heretofore obtained. A surprising result of such process was that the fibers had orientation entanglement which contributed to the improved physical properties of the reinforced elastomers. By milling the fiber loaded compound the fibers are orientated in a longitudinal direction wherein the pass line between the rolls is considered the longitudinal direction. Such orientation does not preclude the entanglement of the ends since such milling is done on a product which is three-dimensional even though the thickness of the compound may be considered relatively thin. The entanglement of the fibers may be at their ends, mid-points or in between, however, the orientation is in the direction of the passline. The degree of orientation is affected by the degree or length of time that the fiber loaded product or compound is milled. In using this process there is no problem in compound splitting or crumbling. It is much easier to handle the cut fibers at the various phases of its use and in its preparation. The fiber loaded compound is then shaped by placing it in a mold and cured or vulcanized.

The following table compares the properties of a base neoprene v-belt compound versus a fiber loaded compound as prepared and described above.

|  | Compd. without Fibers | Compd. with 50 parts Rayon Staple (in fiber direction) |
| --- | --- | --- |
| Tensile (psi) | 2325 | 2,640 |
| Elongation | 218 | 10 |
| Low Strain Modulus (psi) |  |  |
| 1% | 2600 | 37,000 |
| 10% | 1400 | 20,000 |

These values show the high reinforcement that the use of staple fibers as prepared above can impart to a rubber compound. Of particular interest and usefulness is the fact that compounds with the 50 parts of rayon staple fiber (averaging 0.125 inches) has a maximum elongation of only 10% compared to the identical product minus the rayon staple fibers having a 218% elongation. This comparison was made on a neoprene compound specifically formulated and used in the fabrication of v-belts.

Various modifications are contemplated and may obviously be resorted to by those skilled in the art without departing from the described invention, as hereinafter defined by the appended claims, as only a preferred embodiment thereof has been disclosed.

I claim:

1. A process for the molding of a fiber loaded rubber compound comprising the steps of introducing chopped fibers having lengths with a range which averages between one and two inches into a rubber compound, milling said fibers and rubber compound to break up said fibers during milling to a length that ranges between 0.3 and 0.0625 inches while orientating said fibers in a longitudinal direction to form a fiber loaded rubber compound, placing said fiber loaded rubber compound into a mold, molding said fiber loaded compound in said mold to a desired shape, and removing said molded fiber loaded compound from said mold.

2. A process as set forth in claim 1 wherein said milling of said fibers with said rubber compound provides orientation and entanglement of said fibers within said compound.

3. A process as set forth in claim 2 wherein said fibers have a length that is greater than one and one-fourth inches.

4. A process of molding a fiber loaded rubber compound comprising the steps of: chopping staple fibers into fibers having lengths generally greater than 1.25 inches, introducing said chopped fibers into a rubber compound, milling said fiber loaded rubber compound to disperse said fibers throughout and reduce the lengths of said fibers to a range between 0.3 to 0.062 inches, introducing said milled fiber loaded rubber compound into a mold having a predetermined shaped cavity, molding said compound in said mold wherein said molded compound is vulcanized in said mold, and removing the finished article from said mold.

5. A process of molding a fiber loaded rubber compound as set forth in claim 4 wherein said fiber loaded compound is shaped into a v-belt product, and said product is vulcanized as a v-belt.

6. A process of molding a fiber loaded compound as set forth in claim 5 wherein said rubber compound is neoprene.

7. A process for molding a V-belt comprising the steps of introducing fibers having lengths generally greater than 1.25 inches into an elastomeric compound, milling said fiber loaded elastomeric compound to break up said fibers during milling to a length that ranges between 0.3 and 0.0625 inches and to disperse said fibers throughout said compound, shaping said milled fiber loaded compound into a belt having a V-shaped cross section, placing said V-shaped compound into a mold, and thence vulcanizing said fiber loaded compound into a belt product.

8. A process as set forth in claim 7 wherein said milling shears said fibers and provide an orientated entanglement of said fibers.

9. A process as set forth in claim 8 wherein said fibers have a diameter of approximately 11 microns.

10. A process as set forth in claim 9 wherein said mixture of fibers to elastomer is fifty parts to one hundred parts.

11. A process as set forth in claim 10 wherein said fibers are rayon.

* * * * *